(12) United States Patent
Kare et al.

(10) Patent No.: US 12,342,101 B2
(45) Date of Patent: *Jun. 24, 2025

(54) AUTOMATIC IMAGE GENERATOR USING MEETING CONTENT

(71) Applicant: Capital One Services, LLC, McLean, VA (US)

(72) Inventors: Sarvani Kare, Clarksville, MD (US); Daniel Tran, McLean, VA (US); Lee Adcock, Midlothian, VA (US); Geeta Shyamala, Herndon, VA (US); Benjamin Polk, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,259

(22) Filed: Jan. 29, 2024

(65) Prior Publication Data

US 2024/0171706 A1  May 23, 2024

Related U.S. Application Data

(63) Continuation of application No. 17/884,669, filed on Aug. 10, 2022, now Pat. No. 11,937,015.

(51) Int. Cl.
*H04N 7/15* (2006.01)
*G06V 10/70* (2022.01)
(Continued)

(52) U.S. Cl.
CPC ............ *H04N 7/15* (2013.01); *G06V 10/70* (2022.01); *H04L 12/1822* (2013.01);
(Continued)

(58) Field of Classification Search
CPC .............. H04N 7/15; H04N 21/4394; H04N 21/44008; H04L 12/1822
See application file for complete search history.

(56) References Cited

U.S. PATENT DOCUMENTS 10,127,188 B2   11/2018   Bastide et al.
10,552,714 B2   2/2020   Kiapour et al.
(Continued)

OTHER PUBLICATIONS

Mar. 26, 2017,, Ayushman Dash et al. "TAC-GAN—Text Conditioned Auxiliary Classifier Generative Adversarial Network", available at 1703.06412.pdf.

(Continued)

*Primary Examiner* — Hieu T Hoang
(74) *Attorney, Agent, or Firm* — Banner & Witcoff, Ltd.

(57) ABSTRACT

Methods and systems disclosed herein describe generating virtual backgrounds for video communications. A virtual background generator may monitor a user's calendar and/or inbox for meetings. The virtual background generator may analyze the context of calendar invites and/or scheduled meetings to generate one or more virtual backgrounds for a video conference. A first background may be displayed for the video conference. Additionally, the virtual background generator may update the virtual background based on an analysis of one or more topics being discussed during the video conference. Based on the analysis of the one or more topics being discussed, the virtual background generator may generate a second virtual background to replace the first virtual background.

20 Claims, 8 Drawing Sheets

(51) Int. Cl.
*H04L 12/18* (2006.01)
*H04N 21/439* (2011.01)
*H04N 21/44* (2011.01)
*H04N 21/4788* (2011.01)

(52) U.S. Cl.
CPC ... *H04N 21/4394* (2013.01); *H04N 21/44008* (2013.01); *H04N 21/4788* (2013.01)

(56) References Cited

U.S. PATENT DOCUMENTS

| | | | |
|---|---|---|---|
| 10,713,821 | B1 | 7/2020 | Surya et al. |
| 11,317,060 | B1 | 4/2022 | Libin |
| 11,497,980 | B2 | 11/2022 | Putnam et al. |
| 2014/0149913 | A1 | 5/2014 | Gauthier et al. |
| 2014/0208242 | A1 | 7/2014 | Wu |
| 2014/0320591 | A1 | 10/2014 | Baron, Jr. et al. |
| 2017/0142371 | A1 | 5/2017 | Barzuza et al. |
| 2018/0218734 | A1 | 8/2018 | Somech et al. |
| 2020/0057866 | A1* | 2/2020 | Levy ............... H04L 67/14 |
| 2020/0234109 | A1 | 7/2020 | Lee et al. |
| 2020/0286151 | A1 | 9/2020 | Jain et al. |
| 2021/0081902 | A1 | 3/2021 | Pena et al. |
| 2021/0117736 | A1 | 4/2021 | Merler et al. |
| 2021/0295529 | A1 | 9/2021 | Li et al. |
| 2021/0383187 | A1 | 12/2021 | Kalyan et al. |
| 2021/0399911 | A1 | 12/2021 | Jorasch et al. |
| 2021/0400142 | A1 | 12/2021 | Jorasch et al. |
| 2022/0019849 | A1 | 1/2022 | Kim et al. |
| 2022/0239847 | A1 | 7/2022 | Swierk et al. |
| 2022/0272282 | A1 | 8/2022 | Chu et al. |
| 2022/0286641 | A1 | 9/2022 | VanBlon et al. |
| 2022/0351348 | A1 | 11/2022 | Chae et al. |
| 2022/0353474 | A1 | 11/2022 | Springer et al. |
| 2022/0407732 | A1 | 12/2022 | Hellman et al. |
| 2023/0033622 | A1 | 2/2023 | Shah et al. |
| 2023/0044624 | A1 | 2/2023 | Iyer et al. |
| 2023/0122623 | A1 | 4/2023 | Zhang et al. |
| 2023/0132415 | A1 | 5/2023 | Dave et al. |
| 2023/0143034 | A1 | 5/2023 | Wu et al. |
| 2023/0156063 | A1 | 5/2023 | Tiwari et al. |
| 2023/0222236 | A1* | 7/2023 | Devarao ............... G06N 20/00 726/29 |

OTHER PUBLICATIONS

"Timer Zoom Backgrounds" Toastmasters International—Timer Zoom Backgrounds <https://www.toastmasters.org/resources/Timer%20Zoom%20Backgrounds>, website visited Oct. 31, 2023.

"Team Meetings" DocketHQ Team Meetings—Docket (dockethq.com) <https://www.dockethq.com/guides/team-meetings/>, retrieved from the wayback machine on Oct. 31, 2023.

"mmhmm" Product: Web, Mac, Windows, iOS | mmhmm | mmhmm <https://www.mmhmm.app/product>, website visited Oct. 31, 2023.

"Canva" <https://www.canva.com/create/zoom-virtual-background>, website visited Oct. 31, 2023.

"Get a branded, custom background to showcase your business in style" Arlington Strategy Custom Branded Backgrounds | Virtual Zoom Backgrounds | Arlington Strategy <https://arlingtonstrategy.com/custom-branded-zoom-backgrounds/>, website visited Oct. 31, 2023.

Nov. 24, 2020 Pardes, Arielle. "AI Can Run Your Work Meetings Now" Wired.Com., available at AI Can Run Your Work Meetings Now | WIRED <https://www.wired.com/story/ai-can-run-work-meetings-now-headroom-clockwise/>.

Hampe "A Web Based and Time Dependent Visualization of an Event Calendar" iaci.org, Year 2005.

* cited by examiner

AUTOMATIC IMAGE GENERATOR USING MEETING CONTENT

CROSS-REFERENCE TO RELATED APPLICATIONS

The present application is a continuation of co-pending U.S. patent application Ser. No. 17/884,669, filed Aug. 10, 2022 and titled "Automatic Image Generator Using Meeting Content," the disclosure of which is hereby incorporated by reference in its entirety.

The present application is also related to U.S. patent application Ser. No. 17/884,627, filed on Aug. 10, 2022 and titled "Automatic Image Generator Using Meeting Content," the disclosure of which is hereby incorporated by reference in its entirety.

FIELD OF USE

Aspects of the disclosure relate generally to video conferencing and more specifically to using one or more machine learning models to generate a background for video communications.

BACKGROUND

As technology and communication systems have advanced, the virtual meeting has developed into a regular occurrence during the work day. Meeting virtually allows for individuals from different offices and locations to communicate as if they are in the same space. However, the different locations from which individuals participate in a virtual meeting can be distracting. For example, a disorganized home office, a crowded coffee shop, or a pet playing in the background can distract attendees from the content of the meeting. For this reason, a virtual background can be helpful to standardize the meeting environment.

Aspects described herein may address these and other problems, and generally improve the quality, efficiency, and speed of creating a virtual meeting background from the content of the meeting.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Methods and systems disclosed herein may use machine learning to automatically generate a background image for use as a virtual background by participants during a video communication (e.g., virtual meeting). The method may include training a machine learning model to generate one or more backgrounds based on criteria contained in a scheduled meeting and/or a calendar invite. The criteria may include information included in the meeting invitation (e.g., attachment(s) to the meeting, agenda associated with the meeting, list of attendees, message body, etc.), as well as topics discussed during the meeting (e.g., words or phrases spoken by participants, gestures made by participants, messages sent in chat by participants, etc.). Once the machine learning model is trained, a computing device may access a user's calendar via an application programming interface to identify a meeting invite in the user's inbox and/or a meeting on the user's calendar. Using natural language processing, the computing device may parse one or more of the criteria included in the meeting invitation to generate a set of word embeddings. The generated word embeddings may then be inputted into the trained machine learning model to generate the background. After the background is generated, the computing device may cause the background to be displayed as the user's virtual background during the video conference.

Further, some aspects described herein may provide for a computing device that updates a virtual background based on topics discussed during the video conference (e.g., virtual meeting). To update the virtual background, the computing device may receive one or more streams of data during the video conference. The received data streams may be analyzed by the computing device to identify one or more topics being discussed during the video conference. The analysis of the data streams may then be inputted into the trained machine learning model to generate a new background based on what is being discussed in the video conference. After the background is generated, the computing device may cause the updated background to be displayed as the user's virtual background during the video conference.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
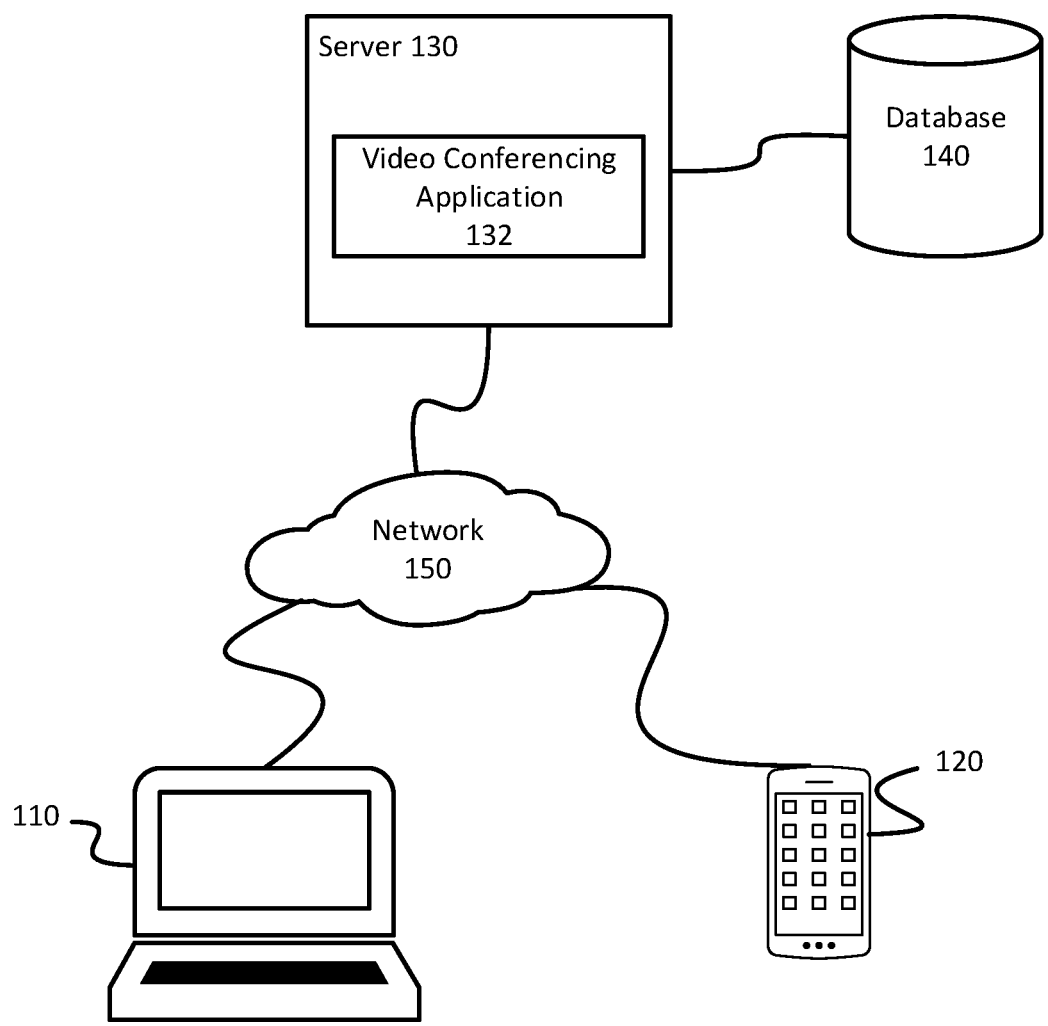
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for generating and updating a virtual background for a video conference using machine learning. A machine learning model may be trained to generate a background using criteria contained in a calendar invitation, meeting invitation, a scheduled calendar event, and/or a scheduled meeting. The generated background may then be displayed as the user's virtual background during a video conference. By utilizing criteria from the meeting, the generated virtual background may help drive the video conference forward by keeping participants engaged, organized, and on schedule. Additionally, the connection with the user's inbox and/or calendar may allow the automated background generator to account for last minute updates to meeting invitees and/or agenda items. The generated virtual background may also create a unified environment for the participants. This represents an improvement over presently available generic backgrounds which may be distracting to meeting participants. Additionally, the automated background generator may reduce the number of computing resources needed to create a virtual background compared to previous techniques for creating a virtual background.

Systems as described herein may include using machine learning models to generate one or more backgrounds that can serve as a virtual background for participants in a video conference. Virtual backgrounds may be used to limit outside distractions during a video conference. For example, a consistent virtual background for all meeting participants may create a unified atmosphere for participants. In another example, a different virtual background may be generated for each individual participant. A virtual background may indicate what a participant's role is within a team or project, what company they work for, and/or what their responsibilities are within the video conference (e.g., host, presenter, notetaker). A virtual background may also be used to drive a meeting forward and encourage participants to utilize the meeting time more efficiently. To accomplish this, a virtual background may show participants the meeting agenda, the amount of time remaining in the meeting, a presentation that accompanies the meeting, and/or any other information that may be pertinent to the video conference.

Additionally, the ability to automatically update the virtual background based on the content of the meeting allows for adjustments to be made as the meeting progresses. In this way, participants can keep track of changing agenda items, actively plan follow-ups and next steps, and/or any updates that may be pertinent to the meeting. The ability to update the background automatically during the meeting may also allow users to progress through presentations using vocal or gesture-based cues.

The automated background generator may represent an improvement over existing methods of generating a virtual background by working directly from a user's inbox and/or calendar. That is, the automated background generator may access a user's calendar, for example, via an application programming interface (API). By accessing a user's inbox and/or calendar, the machine learning model may be able to incorporate any updates to a meeting as criteria for generating the virtual background. The calendar integration may also allow the machine learning model to utilize meeting invitees and/or attachments as criteria for generating the virtual background. In pulling criteria directly from the user's inbox and/or calendar, the automated background generator may improve the user's interactions with the video conference by creating a seamless experience. The automated background generator also improves the use of virtual backgrounds during video conferences. By analyzing streams of data during the meeting, the computing device may be able to generate a virtual background using a machine learning model to reflect topics that the participants are actively discussing. This allows for participants to keep their focus on the content of the video conference rather than allocating time to manually switch and update virtual backgrounds.

FIG. 1 shows an example of a system 100 that includes a first user device 110, a second user device 120, at least one database system 140, and/or at least one server system 130 in communication via a network 150.

First user device 110 may be a computing device configured to allow a user to execute software for a variety of purposes. First user device 110 may be a desktop computer, laptop computer, or alternatively, a virtual computer. The software of first user device 110 may include one or more web browsers that provide access to websites on the Internet. These websites may include video conferencing (e.g., virtual meeting) websites that allow the user to access and/or participate in a video conference. In some embodiments, second user device 120 may include a video conferencing application that allows the user to access and/or participate in a video conference. The video conferencing website and/or the video conferencing application may facilitate participation in the video conference by utilizing one or more cameras and/or microphones contained in first user device 110.

Second user device 120 may be a mobile device, such as a cellular phone, a mobile phone, a smart phone, a tablet, a laptop, or an equivalent thereof. Second user device 120 may belong to a first user that accesses first user device 110, or, alternatively, a second user, different from the first user. Second user device 120 may provide the user with access to various applications and services. For example, second user device 120 may provide the user with access to the Internet. Additionally, second user device 120 may provide the user with one or more applications ("apps") located thereon. The one or more applications may provide the user with a plurality of tools and access to a variety of services. In some embodiments, the one or more applications may include a video conferencing application that allows the user to access and/or participate in a video conference. The application may facilitate participation by utilizing one or more cameras and/or microphones contained in second user device 120.

Server 130 may be any server capable of executing video conferencing application 132. Additionally, server 130 may be communicatively coupled to a first database 140. In this regard, server 130 may be a stand-alone server, a corporate server, or a server located in a server farm or cloud-computer environment. According to some examples, server 130 may be a virtual server hosted on hardware capable of supporting a plurality of virtual servers.

Video conferencing application 132 may be server-based software configured to allow users to communicate with other users through the camera and/or microphone of their devices. In some embodiments, video conferencing application 132 may be server-based software that corresponds to the client-based software executing on first user device 110 and/or second user device 120. Additionally, or alternatively, virtual meeting application 132 may allow users to access a video conference through a website accessed by first user device 110 and/or second user device 120 via network 150. The video conferencing application 132 may comprise an authentication module to verify users before granting access to their video conference.

Database system 140 may be configured to store information on behalf of video conferencing application 132. This information may include, but is not limited to, meeting information, and/or user-preferences. Meeting information may include the date of a video conference, the time of a video conference, the invited participants for a video conference, any attachments contained in the email invitation, the message body of an email invitation for a video conference, and the like. User-preferences may include information about the user's role, prior feedback ratings for generated backgrounds, and the like. Databases may include, but are not limited to relational databases, hierarchical databases, distributed databases, in-memory databases, flat file databases, XML databases, NoSQL databases, graph databases, and/or a combination thereof.

The network 150 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
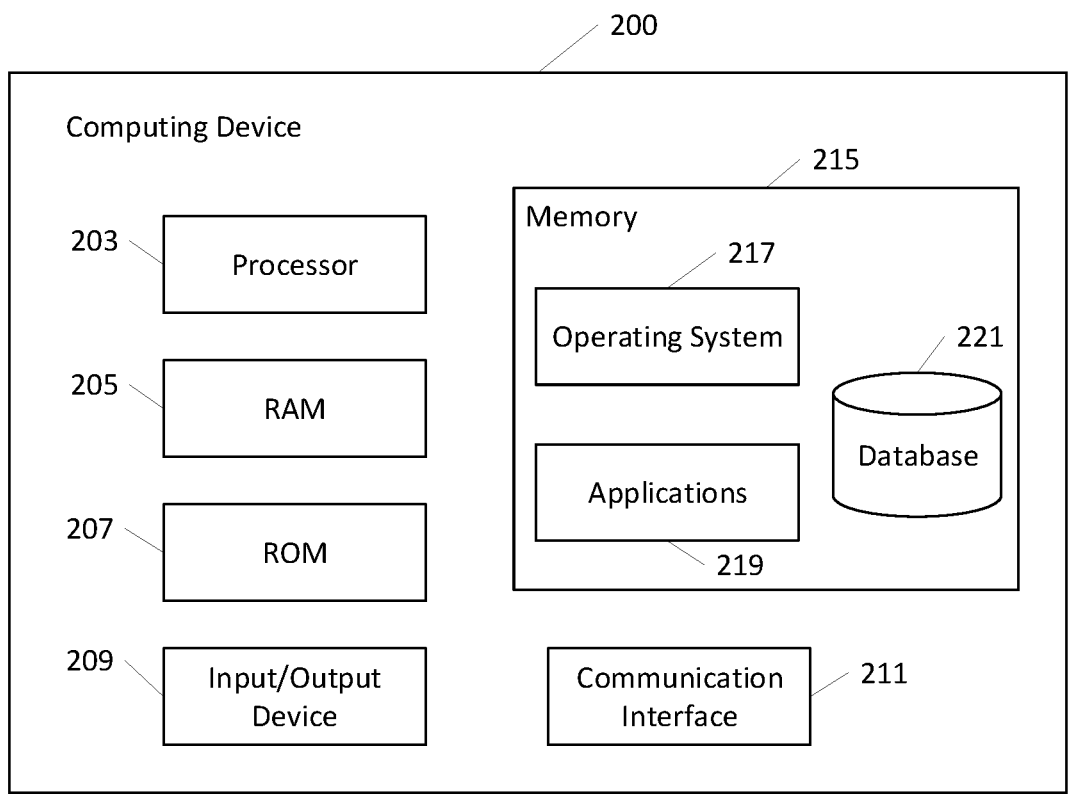
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The application programs 219 may include, for example, the video conferencing applications discussed above with respect to FIG. 1. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Users may wish to have a virtual background generated for an upcoming meeting based on criteria contained in the meeting invitation. For instance, a user who is participating in a video conference to discuss quarterly planning may benefit from having a virtual background that shows attendees the agenda for the meeting.

Figure 3:
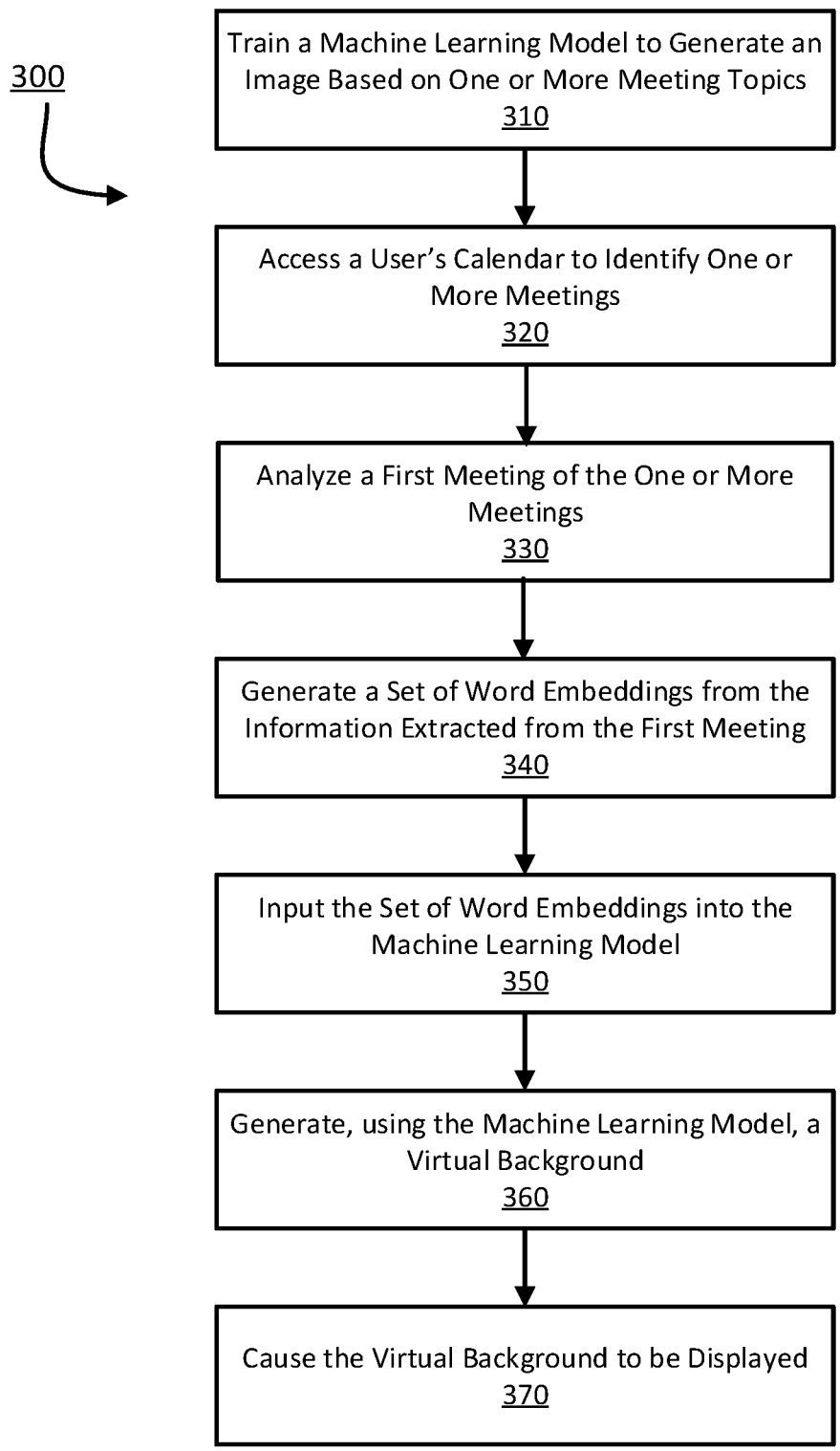
FIG. 3 shows a flow chart of a process for generating a virtual background for a video conference according to one or more aspects of the disclosure.

FIG. 3 shows a flow chart of a process for generating a virtual background image for a video conference according to one or more aspects of the disclosure. Some or all of the steps of process 300 may be performed using one or more computing devices as described herein.

In step 310, the computing device may train a machine learning model to generate one or more backgrounds based on one or more criteria contained in a scheduled meeting and/or a meeting invite. The one or more backgrounds may comprise one or more of a static image, a dynamic image, an animated image, a video, a graphics interchange format (GIF) image, a meeting agenda, an action item list for the first meeting, and/or a presentation. Additionally or alternatively, the one or more backgrounds may be overlays on the user's background. For example, the one or more backgrounds may be a meeting agenda, image, and/or graphic presented overlain on top of a user's background (e.g., virtual background or real-time background). In some examples, the background may comprise a timer. The timer may countdown how much time is left in the meeting. Additionally or alternatively, the timer may countdown how much time an attendee has to present. The meeting may be a video conference, a webinar, or an online meeting. In one example, the computing device may be a server. The one or more criteria may be an attachment to the meeting and/or meeting invite, a list of attendees, a message body associated with the meeting, a set of e-mail addresses associated with the meeting, and/or a subject line associated with the meeting. The one or more criteria may then be provided to a machine learning model such that the machine learning model can be trained to generate a background from the one or more criteria. The machine learning model may support a generative adversarial network, a bidirectional generative adversarial network, an adversarial autoencoder, or an equivalent thereof. Additionally, or alternatively, the machine learning model may be a convolutional neural network, a recurrent neural network, a recursive neural network, a long short-term memory (LSTM), a gated recurrent unit (GRU), an unsupervised pretrained network, a space invariant artificial neural network, or any equivalent thereof. In some embodiments, the machine learning model may be an existing machine learning model. In further embodiments, the machine learning model may be a proprietary model. In some instances, the machine learning model may be trained using different training techniques, such as supervised training, unsupervised training, semi-supervised training back propagation, transfer learning, stochastic gradient descent, learning rate decay, dropout, max pooling, batch normalization, and/or any equivalent deep learning technique.

Once the machine learning model is trained, the machine learning model may be deployed as an application, an email plug-in, a web browser extension, or the like. After receiving permission from a user, the computing device may access a user's calendar to identify one or more meetings, in step 320. Additionally or alternatively, the computing device may monitor a user's inbox for meeting invitations. The calendar and/or the user's inbox may be accessed by the computing device, for example, via an application programming interface (API). In one example, the API may send a request to the user to request access to the user's calendar and/or inbox. To grant access, the user may send a response indicating their approval.

Figure 4:
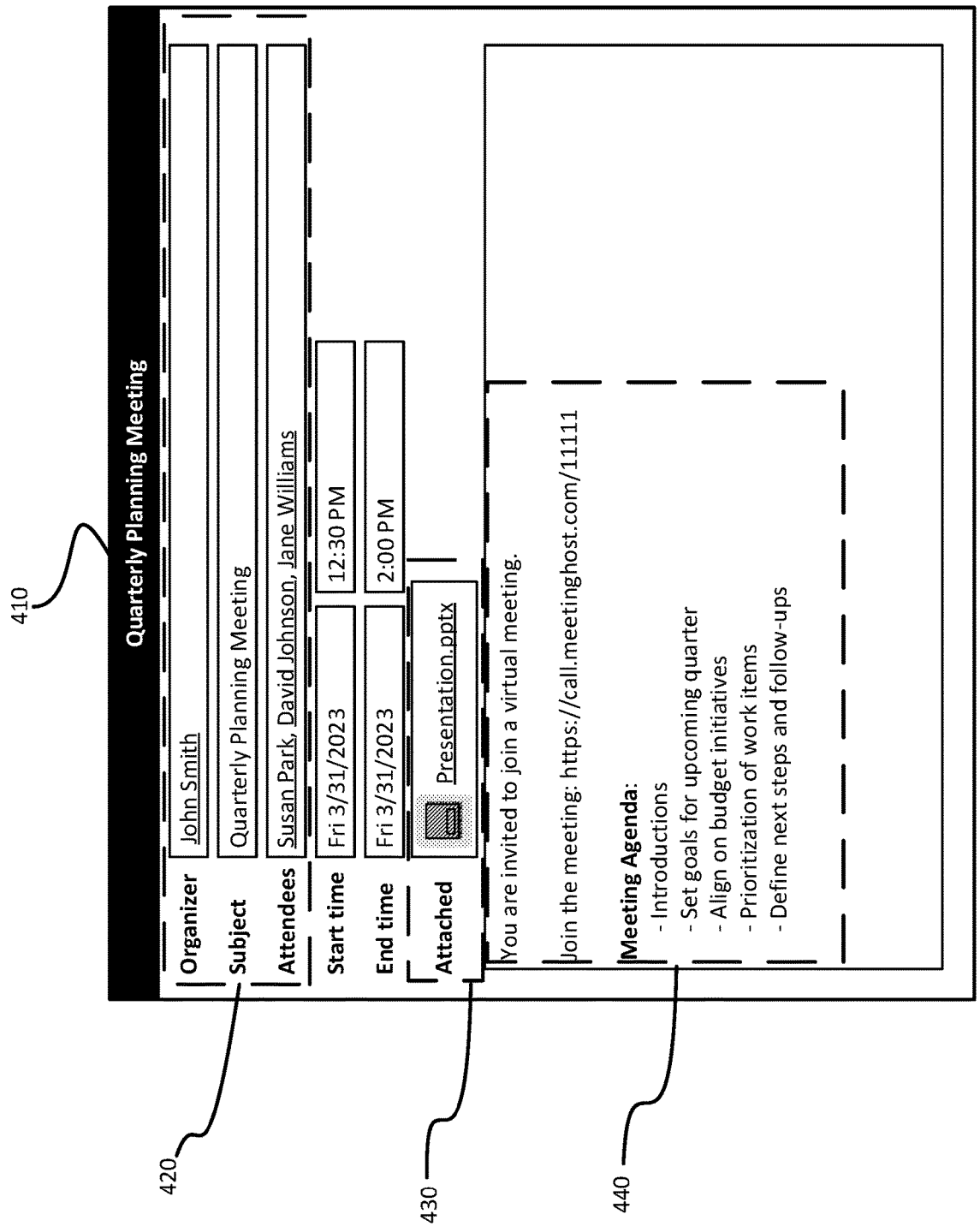
FIG. 4 shows an example of a meeting invitation with one or more criteria according to one or more aspects of the disclosure.

Once the computing device is able to access the user's calendar and/or inbox, the computing device may identify a first meeting containing information, such as dial-in information or a link, for a video conference. The first meeting may be a meeting invitation, a calendar invitation, a scheduled meeting, a scheduled calendar invite, or an equivalent thereof. Once the first meeting containing information for a video conference is identified, the computing device may identify one or more criteria associated with the first meeting. An example of a meeting containing one or more criteria is shown in FIG. 4. In this example, the computing device may analyze and/or parse the meeting to identify one or more criteria contained in the meeting invitation 410. In some examples, the API may request one or more of the fields in the meeting invitation. Additionally or alternatively, the computing device may parse the meeting invitation to identify the one or more fields. The one or more fields may include a header field 420, an attachment field 430, and a body field 440. While only three fields are referenced in FIG. 4, it will be appreciated that more, or fewer, fields may be parsed to obtain one or more criteria for generating the one or more backgrounds. For example, the header field 420 may be analyzed more granularly to identify and/or treat the organizer, the subject of the meeting, and/or the attendees as separate fields. Additionally or alternatively, the date and time of the meeting may be an additional criterion used to generate the one or more backgrounds.

As shown in FIG. 4, the header field 420 may provide information about the organizer, the subject matter (e.g., the subject line), and/or the attendees of the meeting. The computing device may extract attendees' names, usernames, email addresses, etc. After extracting the attendee information, the computing device may query a database and/or directory (e.g., LDAP directory) to obtain information about each of the attendees. For example, the send a request for information about an attendee to a meeting. The request may include the attendee information (e.g., name, username, email address, etc.). The database and/or directory may use the attendee information to look-up additional information about the attendee. The additional information may include the attendee's team, position/role within the organization, and/or the attendee's current physical location. The database and/or directory may send a response to the computing device's request that includes the additional information. The computing device may perform this look-up for each of the meeting attendees. The information obtained from the header field, as well as the additional information obtained from the database and/or directory, may be used by the machine learning model to generate the one or more backgrounds. For example, if the organizer is an executive with an organization, the one or more machine learning models may be trained to generate executive backgrounds. Executive backgrounds may be more formal than other backgrounds. Additionally or alternatively, the executive backgrounds may adhere more closely to corporate media guidelines. In another example, determining whether any of the attendees are external to an organization may be used to generate the one or more backgrounds. That is, if any of the attendees are external to the organization, the one or more machine learning models may be trained to exclude confidential and/or privileged information from the one or more backgrounds. Additionally, or alternatively, the meeting participants may cause a different background to be generated and/or customized for each individual participant.

The attachment field 430 may identify whether one or more attachments are associated with the meeting invitation 410. Attachments may include, for example, documents generated by office productivity software, such as word processor files, presentation files (e.g., PowerPoint® presentations), spreadsheet files, and the like. Additionally, the attachments may include files in the portable document format (PDF). The attachments may be extracted from the meeting invitation (e.g., meeting invitation 410). In some examples, extracting the attachments may include downloading the attachments, for example, to a server. The attachments may then be parsed and/or analyzed to identify text and/or images contained therein. For example, the analysis performed on the attachments may include natural language processing techniques to identify text of the attachments. The analysis may also include using one or more image analysis techniques to identify relevant images and/or graphics contained in the attachments. As will be discussed in greater detail below, the identified text, images, and/or graphics may be used to generate a set of word embeddings that are inputted into the machine learning model used to generate the virtual background.

As shown in FIG. 4, the attachment field 430 shows a type a PowerPoint® presentation attached to the meeting invitation 410. The computing device may obtain (e.g., extract, download, etc.) the PowerPoint® presentation and analyze the PowerPoint® presentation, for example, using image analysis techniques and/or natural language processing. The analysis of the PowerPoint® presentation may be used to generate a set of word embeddings that may be used to generate the one or more backgrounds. Additionally or alternatively, the attached PowerPoint® presentation, or the images and/or graphics contained therein, may be used to generate a background that includes one or more slides from the PowerPoint® presentation and/or the images or graphics from the PowerPoint® presentation. As noted above, other types of attachments may be included in meeting invitation 410. Those attachments may be analyzed (parsed) using techniques similar to those discussed above.

The body field 440 may include a message body associated with the meeting invitation 410. The message body may include information such as the purpose of the meeting, agenda for the meeting, a schedule, and/or any other information that is pertinent to the video conference. The computing device may parse the message body (e.g., body field 440) to identify the information contained therein. The computing device may use natural language processing techniques to identify the information. As will be discussed in greater detail below, the information identified in body field 440 may be used to generate a set of word embeddings that are inputted into the one or more machine learning models used to generate the one or more backgrounds. Additionally or alternatively, information contained in body field 440, such as the meeting agenda, may be used to generate a background that lists one or more agenda items for the video conference.

As explained above, the computing device may use at least one of header field 420, attachment field 430, body field 440, and/or any additional fields to generate the word embeddings that serve as input to the machine learning model to generate the background.

Returning to FIG. 3, the computing device may parse the information contained in the fields identified above to generate a set of word embeddings, in step 330. That is, the information obtained from the fields of the meeting invitation may be analyzed, for example, using natural language techniques (e.g., term frequency-inverse document frequency (TF-IDF)). As noted above, the header field 420 may be analyzed to identify information about the organizer, the subject matter (e.g., the subject line), and/or the attendees. For example, the organizer may be identified as the sender of the meeting invitation. The organizer's name, username, and/or email address may be used to query a database and/or directory to identify additional information about the organizer. Similar analysis may be performed for each of the attendees. The subject matter (e.g., subject line) of the meeting may be analyzed, for example, using natural language processing. The natural language processing may disregard nonce words (e.g., a, an, the, and, to, etc.) and identify (e.g., focus) keywords. In step 340, the information associated with the organizer, the attendees, and/or the subject line may be used to generate word embeddings. For example, the organizer's name may be a first word embedding, the organizer's role may be a second word embedding, the organizer's team may be a third word embedding, and so on. Similarly, each of the keywords identified in the subject line may be a different word embedding.

As noted above, any attachments to the meeting may be analyzed. A computing device may open (e.g., download) one or more attachments to a meeting. The one or more attachments may be analyzed using natural language processing. Like the analysis of the header field 420, the text of the one or more attachments may be analyzed to disregard nonce words and/or identify keywords and/or dates. Additionally or alternatively, the text of the one or more attachments may be analyzed to identify special formatting, such as bullet points. The keywords, dates, and/or special formatting may be used to generate one or more word embeddings. Similarly, the one or more attachments may be analyzed using image analysis techniques. The image analysis techniques may identify images and/or graphics contained in the attachments. The images and/or graphics may include charts, graphs, and the like. The images and/or graphics may be used by the machine learning model to generate the background for the video conference. For example, the images and/or graphics may be inputted into the machine learning model. The machine learning model may incorporate one or more of the images and/or graphics in the one or more generated backgrounds.

Like the header field 420, the body field 440 may be analyzed to identify information about the meeting. Natural language processing may be used to parse the body of the meeting invitation 410. Natural language processing may identify keywords contained in the body field 410, while disregarding nonce words. Similarly, natural language processing may identify special formatting (e.g., bullet points) contained in the body field 420. The keywords and/or the text associated with the special formatting may be used to generate another set of word embeddings.

In step 350, the computing device may input each of the word embeddings described above into the machine learning model. The machine learning model may analyze the one or more word embeddings, from the set of word embeddings, to generate one or more backgrounds, in step 360. In addition to the one or more word embedding, images, graphics, and/or user input may also be inputted into the machine learning model. For example, the images and/or graphics may be content, or media, contained in one or more attachments to the meeting. The images and/or graphics may be charts or other information used to visualize data. As noted above, the content or media may be extracted from the one or more attachments. In another example, the user input may define an appearance for the one or more backgrounds. The appearance may include colors or a schema for the one or more backgrounds. As noted above, the one or more backgrounds may be one or more of a static image, a dynamic image, an animated image, a video, a GIF image, a meeting agenda, an action item list for the first meeting, and/or a presentation associated with the first meeting. Additionally or alternatively, the one or more backgrounds may be an overlay of the user's background (e.g., virtual background or real-time background). The one or more backgrounds may comprise a timer that may countdown how much time is left in the meeting or how much time an attendee has to present.

In step 370, the computing device may cause a first background, of the one or more backgrounds, to be displayed during the video conference. Causing the first background to be displayed may include transmitting (sending) the one or more backgrounds to one or more user devices associated with the meeting attendees. In response to transmitting the one or more backgrounds, the computing device may receive a selection of the first background from a first user device. In some examples, each of the user devices attending the video conference may select a different background to be displayed during the video conference. Accordingly, the computing device may receive a different selection from each of the user device's attending the meeting and cause each of the different selections to be displayed on the respective user devices during the video conference.

After generating the one or more virtual backgrounds, the computing device may send a request for feedback to the one or more client devices. In response to the request, the computing device may receive a feedback score from one or more users. The feedback score may represent a relevance of the one or more generated backgrounds for the video conference. The feedback score may be used to retrain the machine learning model.

By generating a virtual background for a video conference using the techniques described above in FIG. 3, a common user experience can be created for the attendees of the video conference. This may help drive the video conference forward and keep attendees and/or participants engaged, organized, and on schedule. Moreover, the techniques described herein represent an improvement over users creating a virtual background manually and/or other generic backgrounds, which may be distracting to meeting participants. Additionally, the automated background generator may reduce the number of computing resources needed to create a virtual background compared to previous techniques for creating a virtual background.

Figure 5:
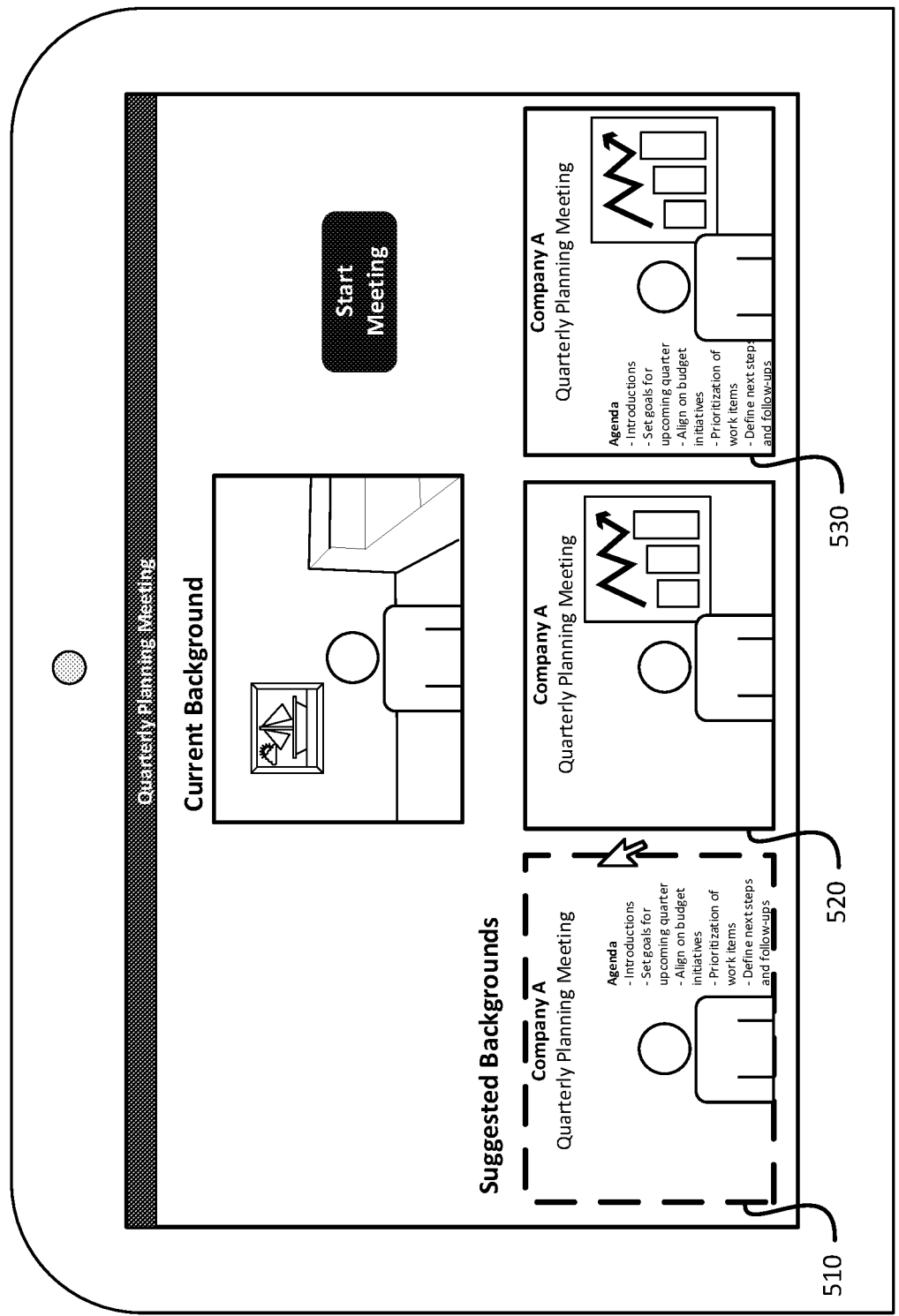
FIG. 5 shows an example of one or more backgrounds being presented to the user for selection according to one or more aspects of the disclosure.

FIG. 5 shows an example of a user selecting an initial background from a set of suggested backgrounds created by the automatic background generator. As shown in FIG. 5, a first background 510, a second background 520, and a third background 530 may be presented to a user for selection. While three backgrounds are shown in FIG. 5, it will be appreciated that more, or fewer, backgrounds may be presented to the user.

As shown in FIG. 5, the first background 510 may display a corporate logo, a title of the meeting, and/or an agenda for the meeting. The corporate logo or name of the company may be generic to all virtual backgrounds associated with an organization. Alternatively, the corporate logo and/or name of the company may be added to virtual backgrounds, for example, based on one or more of the attendees being external to the company. In some examples, a departmental name and/or team name may be displayed alongside, or in lieu of, the corporate logo or name. The title of the meeting may be obtained from the subject line of the meeting invite. As shown in the first background 510, the title of the meeting corresponds to the subject line of the header field 420, in FIG. 4. As noted above, the computing device may analyze the meeting invitation and extract the subject line. As shown in FIG. 5, the subject line may be presented as part of the header of the first background 510. First background 510 also comprises a meeting agenda. The meeting agenda shown in the first background 510 may be obtained from the body field 440. As noted above, the computing device may analyze the body field 440 using natural language processing. The natural language processing may identify keywords and/or special formatting. As depicted in the example shown in the first background 510, the computing device may identify the special formatting of the bullet points and cause the bullet points to be displayed as a virtual background, or an overlay to a background.

The second background 520 may display a corporate logo, a title of the meeting, and/or a graphic. The corporate logo and/or title may be generated using the same techniques described with respect to the first background 510. The graphic may be obtained from one or more attachments to the meeting invitation. As noted above, the computing device may analyze one or more attachments to the meeting invitation. The analysis may include one or more image analysis techniques. The computing device may extract one or more slides (e.g., from a presentation), images, graphics, and/or content from the attachments. The one or more slides, images, graphics, and/or content may be provided to the one or more machine learning models, which may cause the one or more slides, images, graphics, and/or content to be used as part of the virtual background. Additionally or alternatively, the one or more slides, images, graphics, and/or content may be the whole virtual background or overlain on an existing background.

The third background 530 may be an amalgamation of the first background 410 and the second background 520. As shown in FIG. 5, the third background 530 comprises a corporate logo, a title of the meeting, an agenda, and/or a graphic. Each of the fields shown in the third background 530 may be generated using the techniques above. For example, the corporate logo and/or company name may be added by default or based on the attendees. The title may be obtained from the subject line of the meeting invitation. The agenda may be based on the analysis of the body of the meeting invitation. Finally, the graphic may be extracted from one or more attachments to the meeting invitation.

Each of the three backgrounds shown in FIG. 5 may be based on information contained in the meeting invitation. By analyzing the meeting invitation, the computing device may generate one or more options for backgrounds for the video conference. By presenting the user with options, the user may be able to select the background that they believe is best suited to the video conference. Once selected, the virtual background may replace the background of the user's actual location, which may minimize distractions and help drive the discussion that takes place during the video conference.

Figure 6:
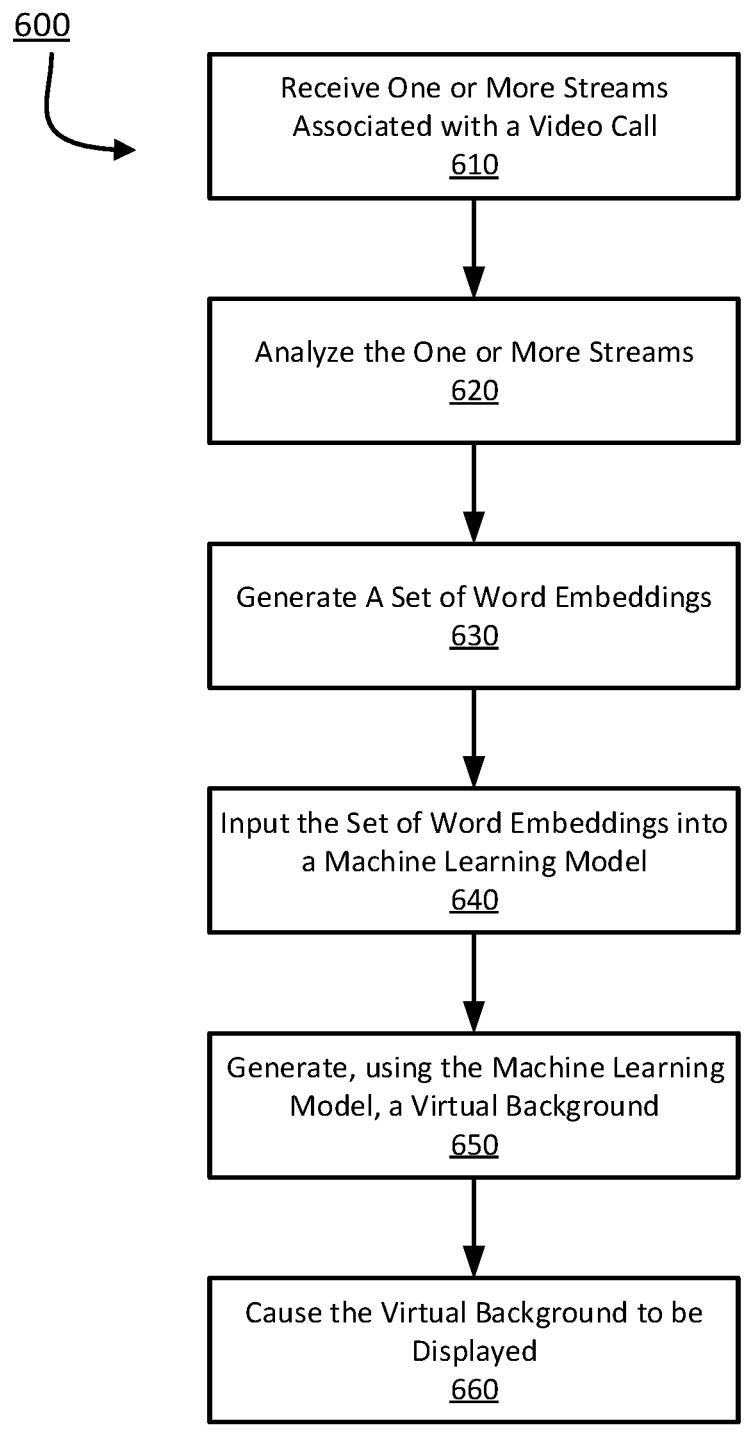
FIG. 6 shows a flow chart of a process for updating a virtual background during a video conference according to one or more aspects of the disclosure.

Users may wish to have the background update during the meeting based on topics being discussed during the meeting. For instance, a user who has a presentation as their background may wish to have the presentation advance to the next slide by saying a phrase, such as "next slide," or performing a swiping gesture. FIG. 6 shows a flow chart of a process for updating a background during a meeting according to one or more aspects of the disclosure. Some or all of the steps of process 600 may be performed using one or more computing devices as described herein.

Figure 7A:
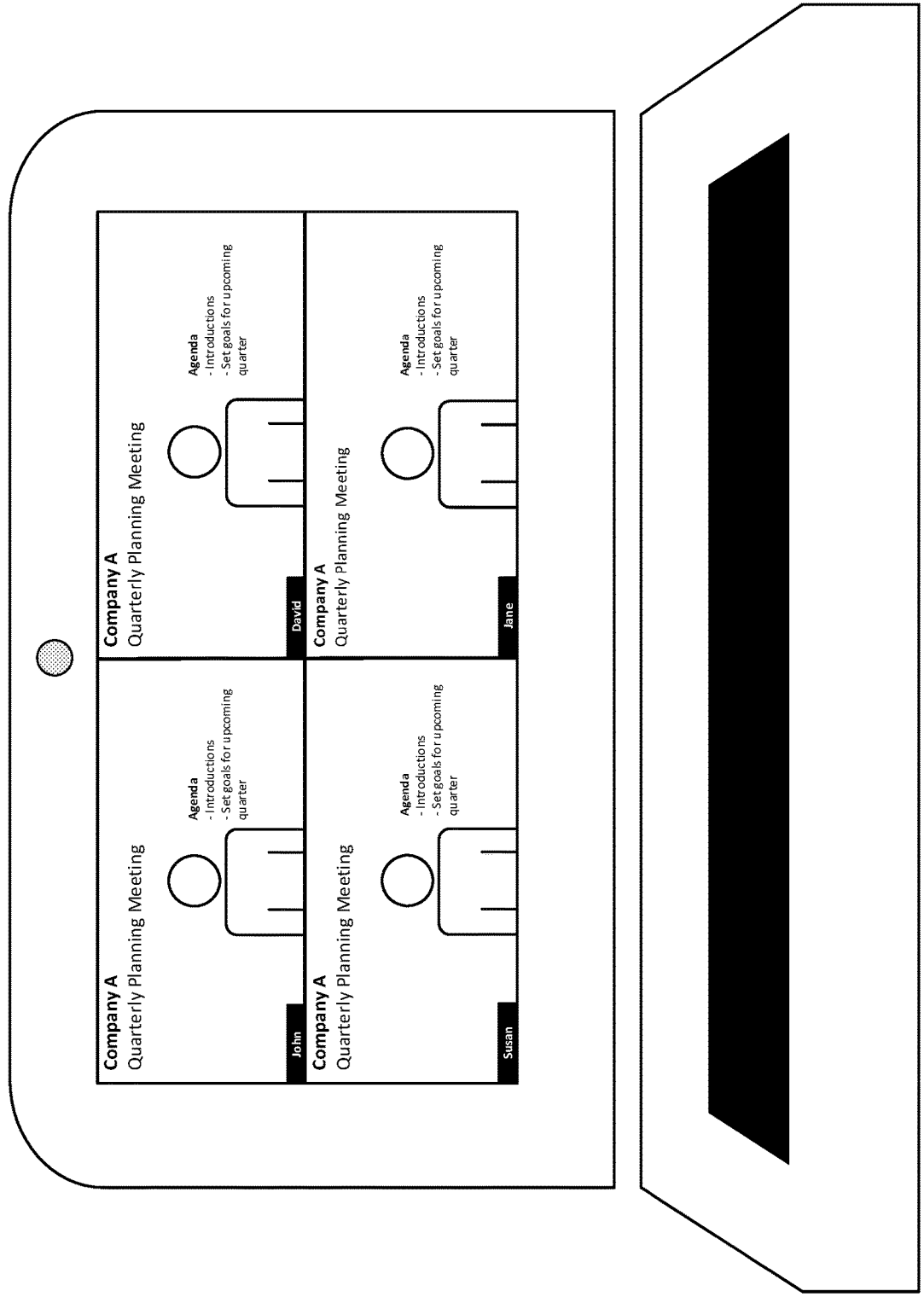
FIG. 7A shows an example of a video conference where the participants are using the generated background according to one or more aspects of the disclosure.

In step 610, a computing device may receive one or more streams of data from one or more devices attending the meeting. The meeting may be in progress and an initial background may have been selected, for example, using the techniques described above with respect to FIGS. 3 and 5. An example of an initial background is shown in FIG. 7A. The initial background may display a name of the meeting. As shown in FIG. 7A, the name of the meeting is "Quarterly Planning Meeting." Additionally or alternatively, the initial background may display agenda items to be discussed or being discussed. As shown in FIG. 7A, two agenda items may be displayed (e.g., "Introductions," "Set Goals for Upcoming Quarter"). It will be appreciated that the two agenda items are merely illustrative and that more, or less, information may be displayed. For example, the entire agenda may be displayed in the initial background. As the agenda items are discussed, bullet points may be changed to check marks to illustrate that those agenda items have been discussed.

The one or streams may comprise at least one of an audio stream, a video stream, or a text data stream. In step 620, a computing device may analyze the one or more streams of data. The one or more streams of data may be analyzed to identify the positioning of the background and whether any of the users block the background in a meaningful way (e.g., block the agenda items being discussed). Additionally, the computing device may analyze the one or more streams of data to identify one or more topics. The one or more topics may be topics being discussed during the virtual meeting. The topics identified may also be the positioning of the user within the virtual background. Additionally, or alternatively, the computing device may analyze the one or more streams of data to identify one or more gestures performed by a user during the virtual meeting.

The analysis of the one or more streams may comprise transcribing an audio stream. Transcribing the audio stream may include using a speech-to-text algorithm. The transcribed text may then be analyzed using a natural language processing technique, such as sentiment analysis, keyword extraction, term frequency-inverse document frequency (TF-IDF), or an equivalent thereof. In another example, analyzing the one or more streams may include analyzing a video stream by using image analysis techniques to identify a gesture being performed by a user. Image analysis techniques may include image segmentation and/or deep learning using a convolutional neural network. In another example, the analysis of the one or more streams may comprise using natural language processing on a text data stream from a text chat associated with the virtual meeting. It will be appreciated that different types of streams may be analyzed concurrently (simultaneously) to determine the topics being discussed during the meeting. For example, an audio stream may be analyzed to determine the topics being discussed, while a video stream may be analyzed, at the same time, to identify one or more gestures from a user, which may cause a presentation to advance to a new slide. As noted the audio stream may be transcribed using a speech-to-text algorithm. The resultant text file may be analyzed using natural language processing to identify one or more keywords in the audio stream. As noted above, nonce words may be disregarded. Similarly, the video stream may be analyzed using an image analysis technique. The image analysis technique may identify one or more gestures, such as swiping to change a slide (e.g., swiping one direction to advance, swiping the other direction to go back), pinching motions to enlarge images and/or graphics, etc. In some instances, the computing device may compare the text analysis to the image analysis to ensure that the text matches the image being displayed. In this regard, the images and/or graphics may comprise keywords. The keywords of the images may be compared to the text analysis to determine whether there is a match.

In step 630, the computing device may use the output of the analysis from step 620 to generate a set of word embeddings. The set of word embeddings may be generated using the techniques described above with respect to FIGS. 3 and 4. For example, the set of word embedding may comprise keywords that are the result of a natural language processor analyzing a transcribed text file to generate one or more word embeddings. The one or more word embeddings may be associated with one or more keywords identified in the text file. Nonce words from the text file may be ignored by the natural language processor. Additionally or alternatively, the one or more word embeddings may comprise one or more keywords associated with an image and/or graphic currently being displayed.

In step 640, the set of word embeddings and/or one or more images and/or graphics associated with the video stream may be input into a machine learning model. Additionally or alternatively, random noise may also be inputted into the machine learning model. The combination of the word embeddings, the one or more images and/or graphics associated with the video stream, and/or the random noise may be used to generate one or more synthetic backgrounds. That is, the machine learning model may receive the set of word embeddings and analyze the set of word embeddings to generate one or more backgrounds. In addition to the set of word embedding, slides, images, graphics, and/or user input may also be inputted into the machine learning model. In another example, the random noise may include user input. The user input may define an appearance for the one or more backgrounds. For example, the appearance may include a color or a schema preference. The machine learning model may analyze the inputs using a generative adversarial network, a bidirectional generative adversarial network, an adversarial autoencoder, or an equivalent thereof. Additionally, or alternatively, the machine learning model may analyze the inputs using a convolutional neural network, a recurrent neural network, a recursive neural network, a LSTM, a GRU, an unsupervised pretrained network, a space invariant artificial neural network, or any equivalent thereof.

In step 650, the computing device, using the machine learning model, may use the word embeddings to generate a second background to update a first background currently being displayed during the virtual meeting. In one example, a user's gesture may cause the generated second background to show a first object from the first background displayed in a different location in the second background. If a user's body positioning is obstructing a word or image in the virtual background, the generated second background may move the word or image to a more visible location within the virtual background. In another example, the second background may display a new slide of a presentation. Additionally, or alternatively, the second background may show an update to an agenda item.

Figure 7B:
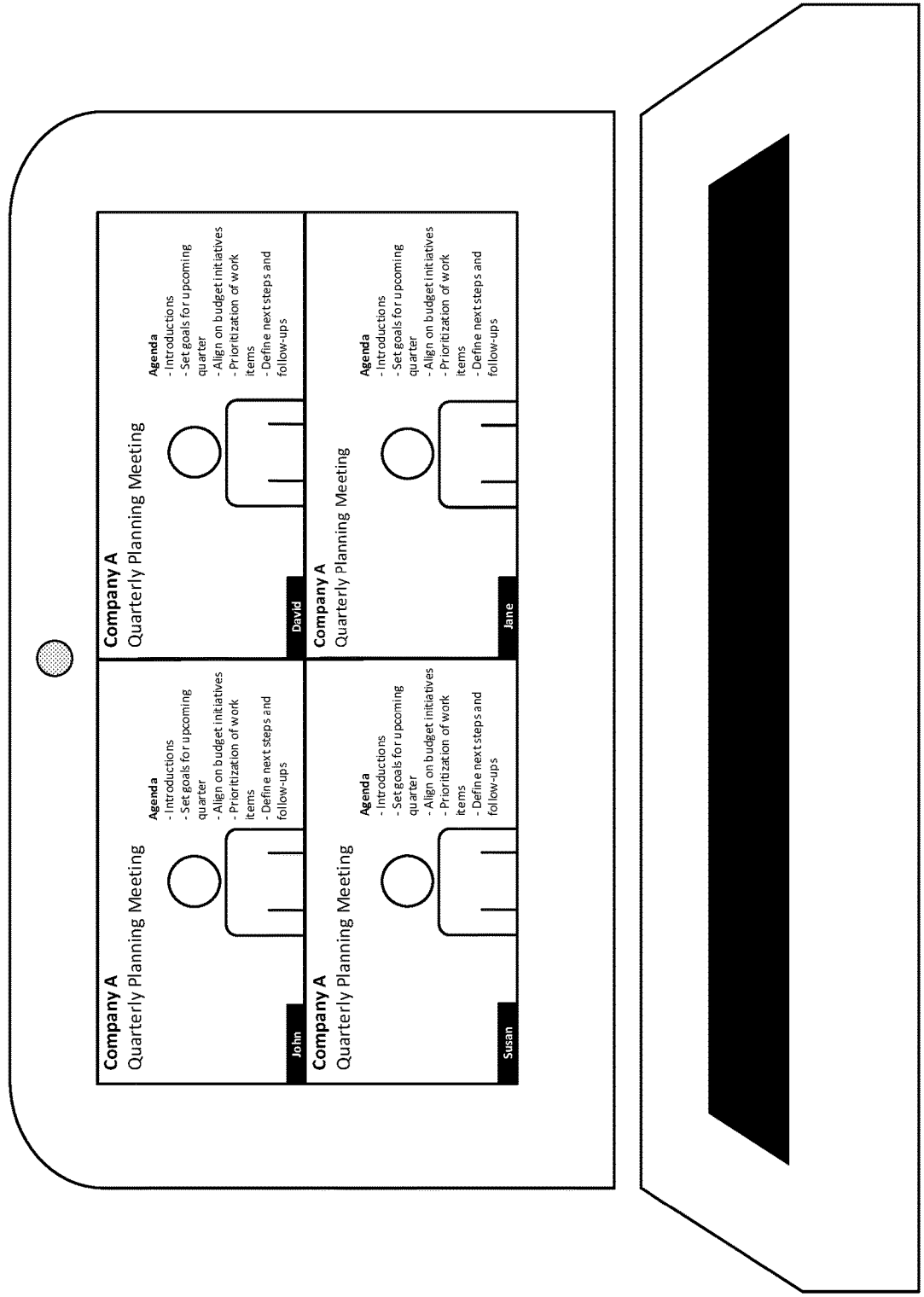
FIG. 7B shows an example of a video conference where the generated background has updating during the video conference according to one or more aspects of the disclosure.

In step 660, the computing device causes the second background to be displayed in place of the first background. An example of the second background image is shown in FIG. 7B. The example shown in FIG. 7B continues the example that started above with the description of FIG. 7A. As shown in FIG. 7B, the second background may include additional agenda items that have been discussed. For example, the second background displayed in FIG. 7B has been updated to include "Align on Budget Initiatives," "Prioritization of Work Items," and "Define Next Steps and Follow-Ups." By updating the background of the meeting, the virtual background generate may keep participants engaged. Further the virtual background may help drive the meeting forward by keeping participants on task. Finally, the virtual background may allow participants who have had to step away from the meeting to determine the current state of the meeting, allowing the participants to remain engaged in the meeting even though they may have stepped away temporarily.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) Python, Perl, or any other suitable scripting language. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

The following paragraphs describe examples that may be implemented in accordance with the present disclosure.

Clause 1. A computer-implemented method comprising: training, by a computing device, a machine learning model to generate one or more background images based on one or more criteria contained in a meeting; accessing, by the computing device and via an application programming interface (API), a first user's calendar to identify one or more first meetings; identifying, by the computing device, a first meeting of the one or more meetings, wherein the first meeting comprises one or more first criteria; parsing, by the computing device and using natural language processing, the one or more first criteria to generate a set of word embeddings; inputting, by the computing device, the set of word embeddings to the machine learning model; generating, by the computing device and using the machine learning model, one or more backgrounds for the first meeting based on the set of word embeddings; and causing, by the computing device, display of a first background of the one or more backgrounds during a video conference associated with the first meeting.

Clause 2. The computer-implemented method of clause 1, wherein the accessing the user's calendar to identify one or more meetings comprises: sending, by the computing device and via the API, a request to access the user's calendar; and receiving, by the computing device and via the API, a response indicating approval to access the user's calendar.

Clause 3. The computer-implemented method of any one of clause 1 or 2, wherein the one or more criteria comprises at least one of: an attachment to the meeting; an agenda associated with the meeting; a list of attendees for the meeting; a message body; a set of e-mail addresses associated with the meeting; or a subject message associated with the meeting.

Clause 4. The computer-implemented method of any one of clauses 1-3, wherein the video conference comprises at least one of: a webinar; or an online meeting.

Clause 5. The computer-implemented method of any one of clauses 1-4, wherein the one or more backgrounds comprise one or more of: a static image; a dynamic image; an animated image; a video; a graphics interchange format (GIF) image; a meeting agenda; an action item list for the first meeting; a presentation associated with the first meeting; or an overlay of an existing background.

Clause 6. The computer-implemented method of any one of clauses 1-5, wherein the computing device comprises a server.

Clause 7. The computer-implemented method of any one of clauses 1-6, wherein the causing display of the first background of the one or more backgrounds during the video conference associated with first meeting comprises: sending, by the computing device and to a client device, a request for a selection from the one or more backgrounds; and receiving, by the computing device and from the client device, a selection of the first background, wherein the first background is displayed based on the selection.

Clause 8. The computer-implemented method of any one of clause 1-7, further comprising: receiving, from the user, a feedback score representing a relevance of the generated background image for the meeting; and using the feedback score to train the machine learning model.

Clause 9. A computing device comprising: one or more processors; and memory storing instructions that, when executed by the one or more processors, cause the computer device to: train a machine learning model to generate one or more background images based on one or more criteria contained in a meeting; access, via an application programming interface (API), a first user's calendar to identify one or more first meetings; identify a first meeting of the one or more meetings, wherein the first meeting comprises one or more first criteria; parse, using natural language processing, the one or more first criteria to generate a set of word embeddings; input the set of word embeddings to the machine learning model; generate, using the machine learning model, one or more backgrounds for the first meeting based on the set of word embeddings; and cause display of a first background of the one or more backgrounds during a video conference associated with the first meeting.

Clause 10. The computing device of clause 9, wherein the instructions to access the user's calendar to identify one or more meetings cause the computing device to: send, via the API, a request to access the user's calendar; and receive, via the API, a response indicating approval to access the user's calendar.

Clause 11. The computing device of any one of clauses 9 or 10, wherein the one or more criteria comprises at least one of: an attachment to the meeting; an agenda associated with the meeting; a list of attendees for the meeting; a message body; a set of e-mail addresses associated with the meeting; or a subject message associated with the meeting.

Clause 12. The computing device of any one of clauses 9-11, wherein the video conference comprises at least one of: a webinar; or an online meeting.

Clause 13. The computing device of any one of clauses 9-12, wherein the one or more backgrounds comprise one or more of: a static image; a dynamic image; an animated image; a video; a graphics interchange format (GIF) image; a meeting agenda; an action item list for the first meeting; a presentation associated with the first meeting; or an overlay on an existing background.

Clause 14. The computing device of any one of clauses 9-13, wherein the instructions for causing display of the first background of the one or more backgrounds during the video conference associated with the first meeting cause the computing device to: send, to a client device, a request for a selection from the one or more backgrounds; and receive, from the client device, a selection of the first background, wherein the first background is displayed based on the selection.

Clause 15. A non-transitory computer-readable media storing instructions that, when executed, cause a computing device to: train a machine learning model to generate one or more background images based on one or more criteria contained in a meeting; access, via an application programming interface (API), a first user's calendar to identify one or more first meetings; identify a first meeting of the one or more meetings, wherein the first meeting comprises one or more first criteria; parse, using natural language processing, the one or more first criteria to generate a set of word embeddings; input the set of word embeddings to the machine learning model; generate, using the machine learning model, one or more backgrounds for the first meeting based on the set of word embeddings; and cause display of a first background of the one or more backgrounds during a video conference associated with the first meeting.

Clause 16. The non-transitory computer-readable media of claim 15, wherein the instructions to access the user's calendar to identify one or more meetings cause the computing device to: send, via the API, a request to access the user's calendar; and receive, via the API, a response indicating approval to access the user's calendar.

Clause 17. The non-transitory computer-readable media of claim 15, wherein the one or more criteria comprises at least one of: an attachment to the meeting; an agenda associated with the meeting; a list of attendees for the meeting; a message body; a set of e-mail addresses associated with the meeting; or a subject message associated with the meeting.

Clause 18. The non-transitory computer-readable media of claim 15, wherein the video conference comprises at least one of: a webinar; or an online meeting.

Clause 19. The non-transitory computer-readable media of claim 15, wherein the one or more backgrounds comprise one or more of: a static image; a dynamic image; an animated image; a video; a graphics interchange format (GIF) image; a meeting agenda; an action item list for the first meeting; a presentation associated with the first meeting; or an overlay for an existing background.

Clause 20. The non-transitory computer-readable media of claim 15, wherein the instructions for the causing display of the first background of the one or more backgrounds during the video conference associated with the first meeting cause the computing device to: send, to a client device, a request for a selection from the one or more backgrounds; and receive, from the client device, a selection of the first background, wherein the first background is displayed based on the selection.

Clause 21. A computer-implemented method comprising: generating, by a computing device and using a machine learning model, one or more first backgrounds for a video conference based on one or more criteria contained in a meeting; causing, by the computing device, display of a first background of the one or more first backgrounds during the video conference; receiving, by the computing device and during the video conference, one or more streams of data from one or more client devices attending the video conference; analyzing, by the computing device, the one or more streams of data to identify one or more topics being discussed during the video conference; generating, by the computing device and using the machine learning model, one or more second backgrounds for the video conference based on the one or more topics being discussed during the video conference, wherein the one or more second backgrounds update the first background currently being displayed during the video conference; and causing, by the computing device, display of a second background, of the one or more second backgrounds, during the video conference.

Clause 22. The computer-implemented method of clause 21, wherein the meeting is obtained by: accessing, by the computing device and via an application programming interface (API), a user's calendar.

Clause 23. The computer-implemented method of any one of clauses 21 or 22, wherein the one or more criteria comprises at least one of: an attachment to the meeting; an agenda associated with the meeting; a list of attendees for the meeting; a message body; a set of e-mail addresses associated with the meeting; a subject message associated with the meeting; a word spoken by an attendee during the meeting; a phrase spoken by an attendee during the meeting; or a gesture made by an attendee during the meeting.

Clause 24. The computer-implemented method of any one of clauses 21-23, wherein the video conference comprises at least one of: a webinar; or an online meeting.

Clause 25. The computer-implemented method of any one of clauses 21-24, wherein the one or more first backgrounds comprise one or more of: a static image; a dynamic image; an animated image; a video; a graphics interchange format (GIF) image; a meeting agenda; an action item list for the meeting; a presentation associated with the meeting; or an overlay for an existing background.

Clause 26. The computer-implemented method of any one of clauses 21-25, wherein the causing display of the first background during the video conference comprises: sending, by the computing device and to a client device of the one or more client devices, a request for a selection of the one or more first backgrounds; and receiving, by the computing device and from the client device, a selection of the first background, wherein the first background is displayed based on the selection.

Clause 27. The computer-implemented method of any one of clauses 21-26, wherein the one or more streams of data comprise at least one of: an audio stream; a video stream; or a text stream.

Clause 28. The computer-implemented method of clause 27, wherein the analyzing the one or more streams of data to identify one or more topics being discussed during the video conference comprises at least one of: transcribing, using a speech-to-text algorithm, the audio stream; inspecting, using an image analysis process, the video stream to identify one or more gestures in the video stream; or analyzing, using natural language processing, the text stream.

Clause 29. A non-transitory computer-readable media storing instructions that, when executed, cause a computing device to: receive, during a video conference, one or more streams of data from one or more devices attending the video conference; analyze the one or more streams of data to identify one or more topics being discussed during the video conference; parse, using natural language processing, the one or more topics to generate a set of word embeddings; input the set of word embeddings to a machine learning model; generate, using the machine learning model, one or more backgrounds for the video conference based on the set of word embeddings, wherein the one or more backgrounds update a first background currently being displayed during the video conference; and cause display of a second background, of the one or more backgrounds, during the video conference.

Clause 30. The non-transitory computer-readable media of clause 29, wherein the one or more streams of data comprise an audio stream.

Clause 31. The non-transitory computer-readable media of clause 30, wherein the instructions, when executed, cause the computing device to transcribe, using a speech-to-text algorithm, the audio stream, wherein the parsing the one or more topics to generate the set of word embeddings further comprises analyzing the transcribed audio stream.

Clause 32. The non-transitory computer-readable media of any one of clauses 29-31, wherein the one or more streams of data comprise a video stream.

Clause 33. The non-transitory computer-readable media of clause 32, wherein the instructions, when executed, cause the computing device to: analyze, using an image analysis process, the video stream; and identify one or more gestures in the video stream.

Clause 34. The non-transitory computer-readable media of clause 33, wherein the one or more gestures causes at least one of: a first object in the first background to be displayed in a different location in the second background; a new slide, of a presentation, to be displayed as the second background; or an agenda item to be updated in the second background.

Clause 35. A computing device comprising: one or more processors; and memory storing instructions that, when executed by the one or more processors, cause the computing device to: receive, during a video conference, one or more streams of data from one or more devices attending the video conference; analyze the one or more streams of data to identify one or more topics being discussed during the video conference; parse, using natural language processing, the one or more topics to generate a set of word embeddings; input the set of word embeddings to a machine learning model; generate, using the machine learning model, one or more backgrounds for the video conference based on the set of word embeddings, wherein the one or more backgrounds update a first background currently being displayed during the video conference; and cause display of a second background, of the one or more backgrounds, during the video conference.

Clause 36. The computing device of clause 35, wherein the one or more streams of data comprise an audio stream.

Clause 37. The computing device of clause 36, wherein the instructions, when executed by the one or more processors, cause the computing device to transcribe, using a speech-to-text algorithm, the audio stream, wherein the parsing the one or more topics to generate the set of word embeddings further comprises analyzing the transcribed audio stream.

Clause 38. The computing device of any one of clause 35-37, wherein the one or more streams of data comprise a video stream.

Clause 39. The computing device of clause 38, wherein the instructions, when executed by the one or more processors, cause the computing device to analyze, using an image analysis process, the video stream; and identify one or more gestures in the video stream.

Clause 40. The computing device of clause 39, wherein the one or more gestures causes at least one of: a first object in the first background to be displayed in a different location in the second background; a new slide, of a presentation, to be displayed as the second background; or an agenda item to be updated in the second background.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
receiving, by a computing device and during a video conference, one or more streams of data from one or more client devices attending the video conference;
analyzing, by the computing device and using a machine learning model, the one or more streams of data to identify one or more topics being discussed during the video conference;
generating, by the computing device and using the machine learning model, one or more second backgrounds for the video conference based on the one or more topics being discussed during the video conference, wherein the machine learning model is configured to exclude confidential information contained in a meeting invitation associated with the video conference when generating the one or more second backgrounds; and
causing, by the computing device, display of a second background, of the one or more second backgrounds, during the video conference, wherein the second background updates a first background displayed during the video conference.

2. The method of claim 1, wherein excluding the confidential information comprises:
  identifying, based on analyzing a first meeting invitation associated with the video conference and using the machine learning model, confidential information;
  analyzing the one or more topics to determine whether the one or more topics comprise the confidential information; and
  based on a determination that the one or more topics comprise the confidential information, generating one or more second backgrounds excluding the confidential information.

3. The method of claim 1, wherein the one or more streams of data comprise at least one of:
  an audio stream;
  a video stream; or
  a text stream.

4. The method of claim 1, wherein analyzing the one or more streams of data to identify one or more topics being discussed during the video conference comprises at least one of:
  transcribing, using a speech-to-text algorithm, an audio stream;
  inspecting, using an image analysis process, a video stream to identify one or more gestures in the video stream; or
  analyzing, using natural language processing, a text stream.

5. The method of claim 1, wherein generating the one or more second backgrounds comprise:
  parsing, using natural language processing, the one or more topics to generate a set of word embeddings; and
  inputting the set of word embeddings into the machine learning model.

6. The method of claim 1, wherein generating the one or more second backgrounds comprise:
  analyzing, based on an image analysis of the one or more streams of data, the first background for logos; and
  based on a determination that a logo is present in the first background, inserting the logo into the one or more second backgrounds.

7. The method of claim 1, further comprising:
  based on generating the one or more second backgrounds, causing the one or more second backgrounds to be displayed as options; and
  receiving a selection of a respective second background of the one or more second backgrounds, wherein the respective second background is displayed in response to the selection.

8. A computing device comprising:
  one or more processors; and
  memory storing instructions that, when executed by the one or more processors, cause the computing device to:
    receive, during a video conference, one or more streams of data from one or more client devices attending the video conference;
    analyze, using a machine learning model, the one or more streams of data to identify one or more topics being discussed during the video conference;
    parse, using natural language processing, the one or more topics to generate a set of word embeddings;
    input the set of word embeddings to the machine learning model;
    generate, using the set of word embeddings, one or more second backgrounds for the video conference, wherein the machine learning model is configured to exclude confidential information contained in a meeting invitation associated with the video conference when generating the one or more second backgrounds; and
    cause display of a second background, of the one or more second backgrounds, during the video conference, wherein the one or more second backgrounds replace a first background displayed during the video conference.

9. The computing device of claim 8, wherein the instructions, when executed by the one or more processors, cause the computing device to:
  determine, based on analyzing a first meeting invitation, that an organizer of the video conference is an executive, wherein the one or more second backgrounds comprise executive backgrounds.

10. The computing device of claim 8, wherein the instructions, when executed by the one or more processors, cause the computing device to:
  determine, based on analyzing a first meeting invitation, that an organizer of the video conference is an executive with an organization; and
  generate, based on previously received corporate media guidelines associated with executives, the one or more second backgrounds.

11. The computing device of claim 8, wherein the instructions, when executed by the one or more processors, cause the computing device to:
  determine, based on analyzing a first meeting invitation, that an organizer of the video conference is an executive with an organization;
  generate, using the set of word embeddings and based on the determination that the organizer is an executive, a third background for the video conference, wherein the machine learning model is further configured to include the confidential information when generating the third background; and
  cause display of the third background.

12. The computing device of claim 8, wherein the instructions, when executed by the one or more processors, cause the computing device to:
  determine, based on analyzing the one or more streams of data, whether any attendees in the video conference are external to an organization;
  determining, based on analyzing a first meeting invitation associated with the video conference, confidential information;
  analyzing the one or more topics to identify the confidential information, wherein the machine learning model is configured to exclude confidential information when generating first or second backgrounds;
  generate, using the set of word embeddings, a third background for the video conference; and
  based on a determination that no attendees are external to the organization, cause display of the third background.

13. The computing device of claim 8, wherein the instructions, when executed by the one or more processors, cause the computing device to:
  based on displaying the second background, transmit a request for feedback to one or more devices associated with the video conference, wherein the requested feedback comprises a relevance score; and
  update the machine learning model based on received relevance scores.

14. The computing device of claim 8, wherein the generated one or more second backgrounds comprise a timer displaying how much time is left in the video conference.

15. A non-transitory computer-readable medium storing instructions that, when executed, cause a server to:
- receive, during a video conference, one or more streams of data from one or more client devices attending the video conference, wherein one of the one or more streams of data comprises a video stream;
- analyze, using a machine learning model, the video stream to identify one or more topics being discussed during the video conference;
- inspect, using an image analysis process, a video stream to identify one or more gestures in the video stream;
- generate, based on identifying the one or more gestures and based on the identified one or more topics, one or more second backgrounds for the video conference, wherein the machine learning model is configured to exclude confidential information contained in a meeting invitation associated with the video conference when generating the one or more second backgrounds; and
- cause display of a second background, of the one or more second backgrounds, during the video conference, wherein the second background updates a first background currently being displayed during the video conference.

16. The non-transitory computer-readable medium of claim 15, wherein the identified one or more gestures comprise at least one of a swiping gesture or a pinching gesture.

17. The non-transitory computer-readable medium of claim 15, wherein the instructions, when executed, cause the server to:
- analyze, based on identifying a swiping gesture, a direction of the swiping gesture; and
- cause display of the second background following the direction of the swiping gesture.

18. The non-transitory computer-readable medium of claim 15, wherein the instructions, when executed, cause the server to:
- enlarge, based on identifying a pinching gesture, the second background.

19. The non-transitory computer-readable medium of claim 15, wherein excluding the confidential information comprises:
- identifying, based on analyzing a first meeting invitation associated with the video conference and using the machine learning model, confidential information;
- analyzing the one or more topics to identify the confidential information; and
- based on identifying confidential information, generating one or more second backgrounds excluding the confidential information.

20. The non-transitory computer-readable medium of claim 15, wherein the instructions, when executed, cause the server to:
- during inspection of the video stream, analyze an image of the video data for one or more keywords;
- compare, based on a text analysis of an audio stream associated with the video stream, the one or more keywords to a displayed text of the video data; and
- based on a determination that one of more keywords are associated with the displayed text, generate a set of word embeddings based on the one or more keywords, wherein generating the second background is based on the set of word embeddings.

* * * * *